(12) United States Patent
Justice et al.

(10) Patent No.: US 10,078,791 B2
(45) Date of Patent: Sep. 18, 2018

(54) METHODS AND DEVICES FOR COGNITIVE-BASED IMAGE DATA ANALYTICS IN REAL TIME

(71) Applicant: Irvine Sensors Corporation, Costa Mesa, CA (US)

(72) Inventors: James Justice, Newport Beach, CA (US); David Ludwig, Irvine, CA (US); Virgilio Villacorta, Corona, CA (US); Omar Asadi, Garden Grove, CA (US); Fredrik Knutson, Irvine, CA (US); Mannchuoy Yam, Santa Ana, CA (US); Eric Weaver, Westminster, CA (US)

(73) Assignee: Irvine Sensors Corporation, Costa Mesa, CA (US)

(*) Notice: Subject to any disclaimer, the term of this patent is extended or adjusted under 35 U.S.C. 154(b) by 0 days.

(21) Appl. No.: 14/593,021

(22) Filed: Jan. 9, 2015

(65) Prior Publication Data

US 2017/0372153 A1  Dec. 28, 2017

Related U.S. Application Data

(60) Provisional application No. 61/925,615, filed on Jan. 9, 2014.

(51) Int. Cl.
| | |
|---|---|
| *G06K 9/64* | (2006.01) |
| *G06K 9/00* | (2006.01) |
| *G06K 9/62* | (2006.01) |
| G06K 9/46 | (2006.01) |
| G06T 7/277 | (2017.01) |

(52) U.S. Cl.
CPC ....... *G06K 9/00986* (2013.01); *G06K 9/6262* (2013.01); *G06K 9/00718* (2013.01); *G06K 9/00771* (2013.01); *G06K 9/4671* (2013.01); *G06K 9/6277* (2013.01); *G06T 7/277* (2017.01); *G06T 2207/20081* (2013.01); *G06T 2207/30232* (2013.01)

(58) Field of Classification Search
None
See application file for complete search history.

(56) References Cited

U.S. PATENT DOCUMENTS

| | | | |
|---|---|---|---|
| 2009/0322800 A1* | 12/2009 | Atkins | G09G 3/3413 345/690 |
| 2010/0231603 A1* | 9/2010 | Kang | G09G 3/3426 345/591 |

(Continued)

*Primary Examiner* — Iman K Kholdebarin
(74) *Attorney, Agent, or Firm* — W. Eric Boyd, Esq.

(57) ABSTRACT

An invention is disclosed for a real time video analytic processor that embodies algorithms and processing architectures that process a wide variety of sensor images in a fashion that emulates how the human visual path processes and interprets image content. spatial, temporal, and color content of images are analyzed and the salient features of the images determined. These salient features are then compared to the salient features of objects of user interest in order to detect, track, classify, and characterize the activities of the objects. Objects or activities of interest are annotated in the image streams and alerts of critical events are provided to users. Instantiation of the cognitive processing can be accomplished on multi-FPGA and multi-GPU processing hardwares.

10 Claims, 9 Drawing Sheets

Cognitive Image Processing Architecture

(56) References Cited

U.S. PATENT DOCUMENTS

| | | | |
|---|---|---|---|
| 2012/0170024 A1* | 7/2012 | Azzazy | G01J 3/0202 |
| | | | 356/51 |
| 2013/0300838 A1* | 11/2013 | Borowski | G01S 7/486 |
| | | | 348/46 |
| 2014/0019166 A1* | 1/2014 | Swanson | G06Q 40/08 |
| | | | 705/4 |
| 2014/0163772 A1* | 6/2014 | Vian | G05D 1/0094 |
| | | | 701/2 |
| 2016/0125606 A1* | 5/2016 | Justice | G06K 9/00986 |
| | | | 382/304 |
| 2016/0267669 A1* | 9/2016 | Justice | G01S 17/89 |

\* cited by examiner

Cognitive Image Processing Architecture

Convolution and Threshold

- Convolution
  - Performs convolution on Visible x4 (3 colors + 1 grayscale)
  - 16 Gabor filters each channel
    - Time multiplex between filters
    - Parallel processing each channel
    - 8 filters dedicated for fixed structures; 8 dedicated to dismount groups
- Threshold
  - Image blocking of convolved output
  - Calculates variance for each block
  - Keeps 10% of block with highest variance
  - Variance sorted with highest deviation at top
  - Output results rendered as hit file

Threshold

FIG 8

Pyramidal Bayesian Network

METHODS AND DEVICES FOR COGNITIVE-BASED IMAGE DATA ANALYTICS IN REAL TIME

CROSS-REFERENCE TO RELATED APPLICATIONS

This application claims the benefit of U.S. Provisional Patent Application No. 61/925,615, filed on Jan. 9, 2014 entitled "Methods and Devices for Cognitive-based Image Data Analytics in Real Time" pursuant to 35 USC 119, which application is incorporated fully herein by reference.

STATEMENT REGARDING FEDERALLY SPONSORED RESEARCH AND DEVELOPMENT

N/A

BACKGROUND OF THE INVENTION

1. Field of the Invention

The invention relates generally to the field of image processing. More specifically, the invention relates to real time processing of massive sensor data streams of still imagery, video imagery, thermal imagery, multispectral imagery, hyperspectral imagery, Light Detection and Ranging (LIDAR) imagery and radar imagery. Attributes in the scene are identified by running a plurality of processing algorithms on the image data which are in the form of convolutions on spatial, temporal, and color contents of images and which, with subsequent cross-modal correlations which emulate the image processing of the human visual path consisting of eye, retina, and cortex based processing functions. The invention produces object detections, object tracks, object classifications, and activity recognition and interpretations with negligible latencies. Data analysts and surveillance system operators are not able to provide timely and effective results from these data streams using traditional analytical methods and tools.

2. Description of the Related Art

Military and commercial users have been developing imaging sensors for over forty years as a means to recognize targets based unique features of their signatures in images. These sensors have high data output capable of quickly overwhelming the capacity of current communication links Prior art attempts have partially solved this problem through processing and reporting on a limited set of feature signatures and recording all data for later post-mission analysis. For example, such techniques as Automatic Target Recognition (ATR) require extensive spatial models representing many possible views of targets to be detected and recognized. These techniques have never produced satisfactory probabilities of detection with acceptable levels of false detections. Other techniques based on some degree of modeling of neural systems exploit neural networks which must trained by analyzing extensive data sets to recognize targets or to recognize anomalous images. These techniques likewise have not performed well over the wide variety of imaging conditions that can occur. Modern learning methods, while making a contribution to the problem posed, have not produced acceptable timely and effective image data processing and exploitation.

It would be hugely beneficial to integrate herein a sensor data processor for use in the sensor suite that significantly increases the timeliness and effectiveness of the data processing, exploitation, and dissemination.

The invention permits the optimization and operational deployment of a processor utilizing cognitive image processing principles which analyzes sensor outputs and annotates regions of potential threat or regions having pre-determined characteristics equally at the same rate as the sensor is producing data.

The invention enhances the performance of analysts by significantly reducing the time required for assessment and distribution of results and improving the probability of potential threat and threat activity detection, prioritization, and operator/analyst alerting.

BRIEF SUMMARY OF THE INVENTION

These and other aspects, embodiments, and features of the invention emulate how the human visual path processes large data volumes and identifies regions or target areas of salient interest, track these objects, classifies these objects, and interprets target object activities. The saliency technique classifies objects of interest by computing their features in space, time, and color and establishing the degree of correlation between the observed objects and the objects of interest. A key part of the invention is the computation of the saliency of observes objects.

These and various additional aspects, embodiments and advantages of the present invention will become immediately apparent to those of ordinary skill in the art upon review of the Detailed Description and any claims to follow.

While the claimed apparatus and method herein has or will be described for the sake of grammatical fluidity with functional explanations, it is to be understood that the claims, unless expressly formulated under 35 USC 112, are not to be construed as necessarily limited in any way by the construction of "means" or "steps" limitations, but are to be accorded the full scope of the meaning and equivalents of the definition provided by the claims under the judicial doctrine of equivalents, and in the case where the claims are expressly formulated under 35 USC 112, are to be accorded full statutory equivalents under 35 USC 112.

BRIEF DESCRIPTION OF THE SEVERAL VIEWS OF THE DRAWINGS

FIG. 8 is an illustration of convolution and threshold.

The invention and its various embodiments can now be better understood by turning to the following detailed description of the preferred embodiments which are presented as illustrated examples of the invention defined in the claims. It is expressly understood that the invention as defined by the claims may be broader than the illustrated embodiments described below.

DETAILED DESCRIPTION OF THE INVENTION

Detailed Description of Preferred Embodiments

In the Summary above and in this Detailed Description of Preferred Embodiments, reference is made to particular features (including method steps) of the invention. Where a particular feature is disclosed in the context of a particular aspect or embodiment of the invention, that feature can also be used, to the extent possible, in combination with and/or in the context of other particular aspects and embodiments of the invention, and in the invention generally.

The term "comprises" is used herein to mean that other features, ingredients, steps, etc. are optionally present. When reference is made herein to a method comprising two or more defined steps, the steps can be carried in any order or simultaneously (except where the context excludes that possibility), and the method can include one or more steps which are carried out before any of the defined steps, between two of the defined steps, or after all of the defined steps (except where the context excludes that possibility).

This invention may be embodied in many different forms and should not be construed as limited to the embodiments set forth herein. Rather, these embodiments are provided so that this disclosure will convey preferred embodiments of the invention to those skilled in the art.

Figure 1:
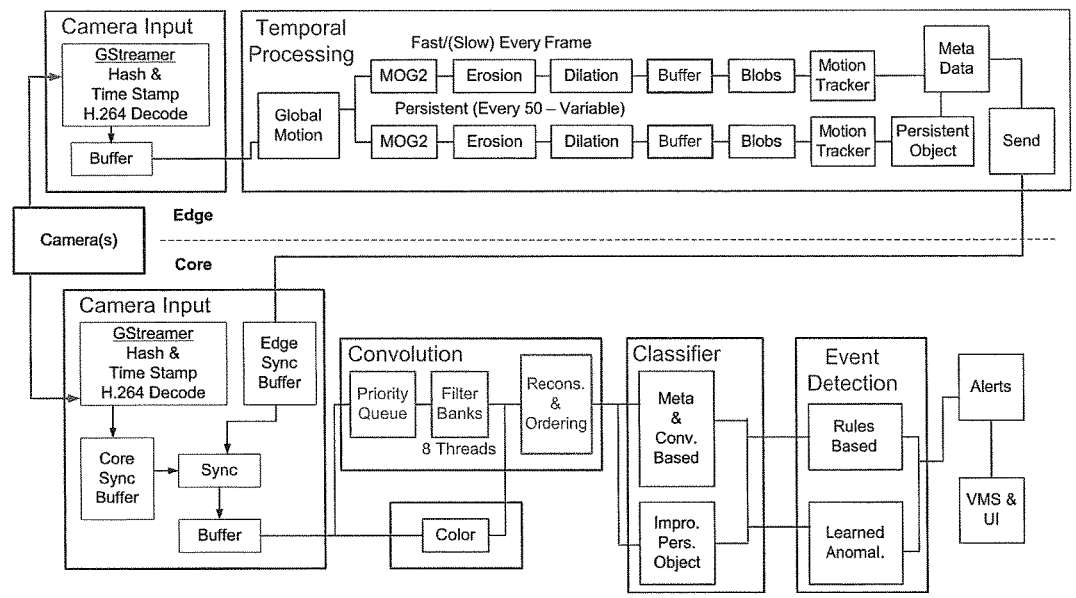
FIG. 1 is a schematic illustration of the image processing architecture.

The invention's saliency processing approach, as illustrated in FIG. 1, relies on characterizing the spatial content (size, shape, orientation), temporal content, and color content of the imagery from multiple images or spectra and characterizing the data by determining locations where the content (spatial, temporal, color, spectral, and/or hyperspectral) matches that of known objects or events of interest and where locations show anomalous signatures when compared to adjacent locations. This processing is accomplished in parallel and at an accelerated rate.

Major elements of a preferred system of the invention may consist of one or a plurality of "edge" processors dedicated to analyzing each camera or sensor and one or a plurality of "core" processors configured for analyzing data frames of interest from all system sensors, and edge processor metadata.

The system elements cooperate to show cognitive video analytics, to include spatio-temporal and color saliency, object classification and tracking within the data frames. An alternative embodiment of the system may comprise a modified core processor that subsumes all edge processing and core processing in a single unit.

Various embodiments of the system are enabled and may include, without limitation:

1. Direct Core Mode: Internet Protocol (IP) cameras connected directly to core via Gigabit Ethernet (GigE) connections or via a network switch. Without edge processor analytic metadata, the core can support the analytic processing of up to, in one embodiment, eight High-Definition (HD) IP cameras.
2. Synergy Mode: Every IP camera directly connected to an edge processor, which are in turn connected to the core processor. This mode allows the core to support a security system with many cameras (e.g., 30-100), using edge data analytics to identify which cameras and even windows within those cameras require further image processing. That is, by analyzing the analytic metadata from all edge processors, the core may be configured to dynamically allocate processing resources to priority threats, uncompressing and processing at the appropriate resolution of only threat identified video streams.
3. The system may be provided as a standalone system or integrated within a Video Management System (VMS) Application Program Interface (API).

The temporal processing module is responsible for determining motion-based salient features of the scene. According to FIG. 1, the temporal processing module may always run before the spatial processing module on the same data set. The camera capture module is thus responsible for decoding the incoming video and feeding the main control logic with one frame at a time per camera. The annotation module is responsible for actually drawing the bounding boxes on each frame before sending the frame off to the analyst's video management system to be displayed as a video for the analyst.

Figure 2:
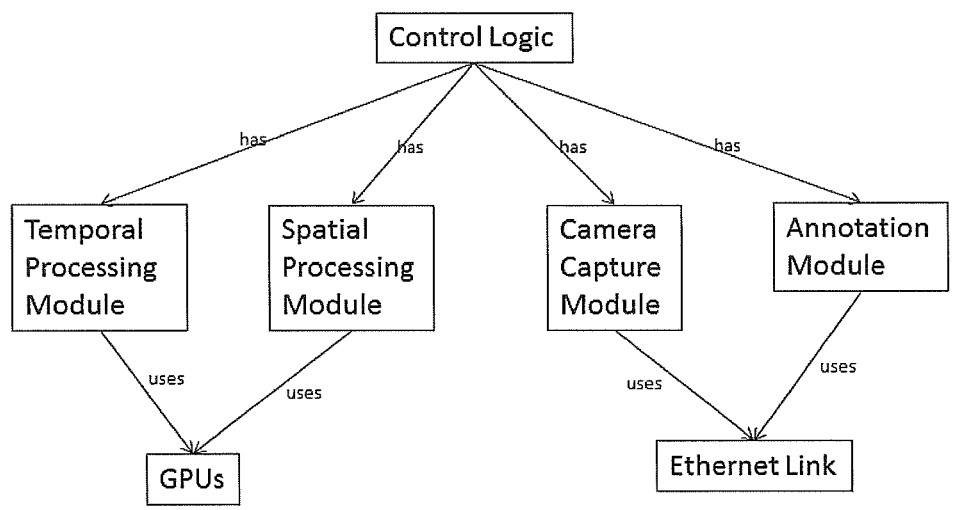
FIG. 2 is a schematic illustration of the entity-relationship diagram.

The system may be configured to be a single machine or unit that processes video before outputting the data to the video management system. Note the Central Processing Unit (CPU) is not depicted in the diagram of FIG. 2 as each module is a piece of software, which must run on a CPU. The Graphics Processing Units (GPUs) are included because they are specialized hardware used to accelerate processing to the point of analyzing video in real time. The Ethernet link is included as the communication pathway with the cameras and VMS.

The Camera Capture module in FIG. 1 continuously reads in the video streams from each connected camera.

The Annotation module in FIG. 1 supplies the VMS with properly and consistently annotated frames.

The processor can be configured with different settings for the frame rate of camera input, frame rate of temporal processing, number of cameras being processed in parallel, expected size of objects in pixels for the spatial processing, and what type of objects to locate and annotate. The analyst may specify differing priorities for certain cameras in relation to the remainder of the cameras, and may additionally specify priority regions within a camera's field of view. Each of these is illustrated in FIG. 1.

The Cognitive Processor approximates performance in real time, with a processing time latency of no more than 500 msec.

The Camera Capture module detects and immediately notifies the analyst if a video stream has been lost and will automatically attempt to restart the video stream and resume functionality with no other issues.

The Cognitive Processor can be configured to handle corrupted data without terminating the process.

Figure 3:
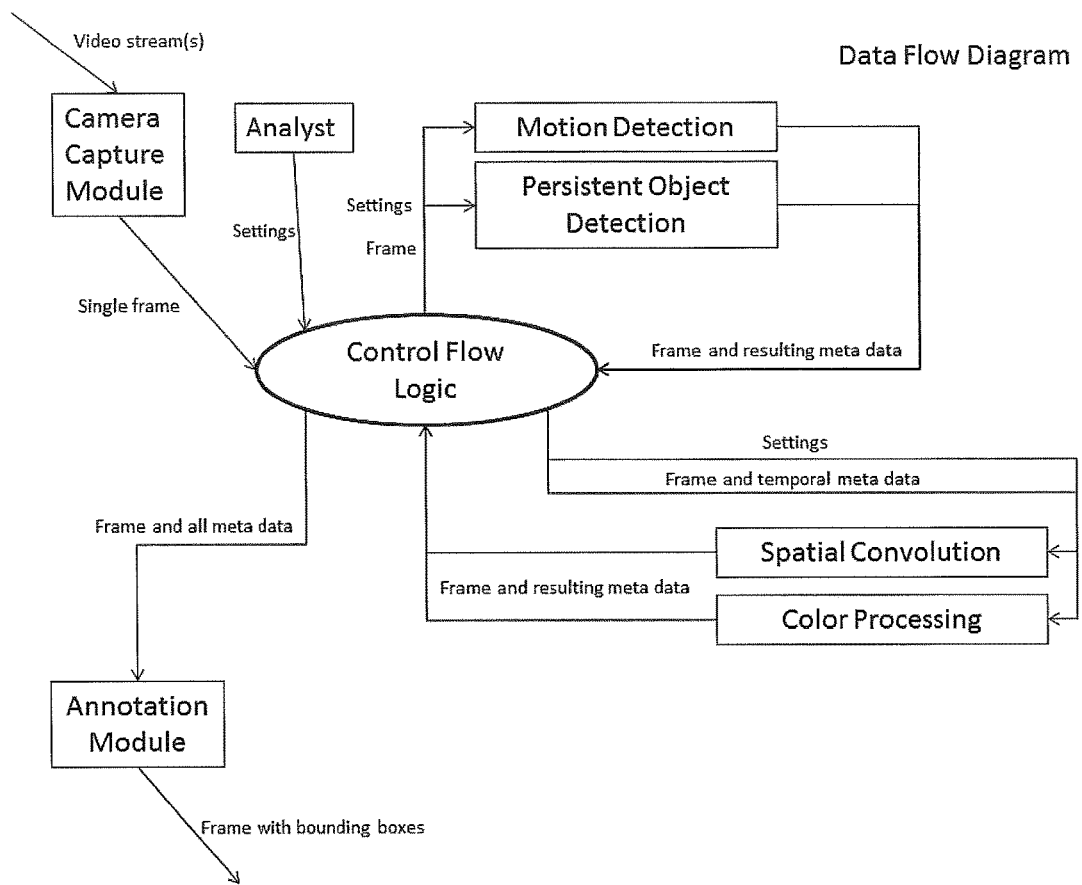
FIG. 3 is a schematic illustration of the data flow diagram.

The motion detection and persistent object detection are both part of the overall temporal processing module of the system and are executed prior to the spatial convolution, color processing and object classification, as illustrated in FIG. 3.

As shown in FIG. 3, the frame and metadata travel from and return to the control flow logic rather than traveling directly from module to module in the event that the analyst has elected not to run any of the modules. Default operation involves executing both modules prior to annotation.

Multiple configurations of the system are enabled but the underlying software architecture remains generally the same in each. A difference between the two is the hardware on which the system runs. An increased number of GPUs or the use of high performance elements gives the ability to process many HD cameras in parallel.

Figure 4:
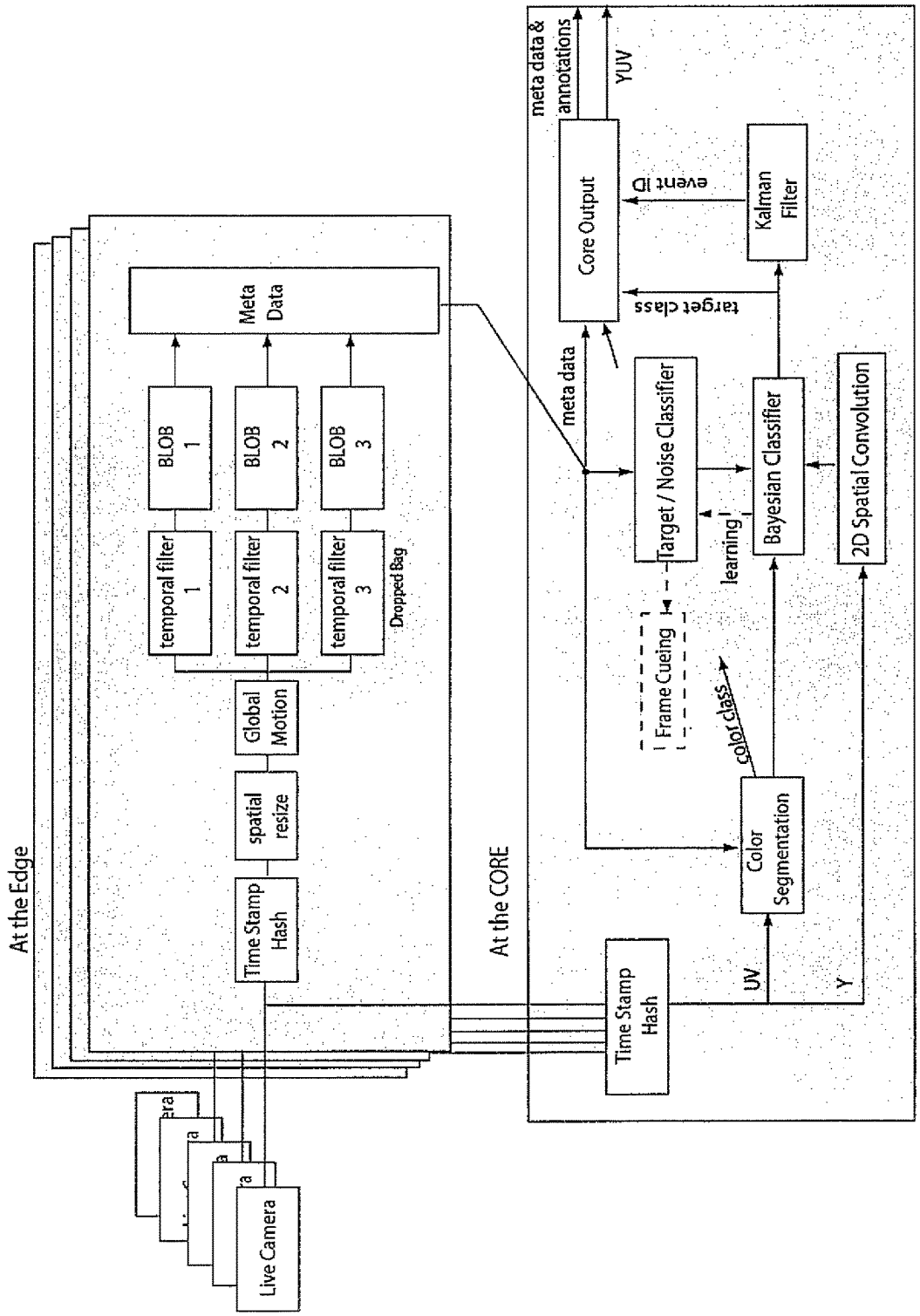
FIG. 4 is a schematic illustration of the system processing pipeline overview.

The core processor, edge processor, and IP cameras communicate in the system via a hash synchronization mechanism, illustrated in FIG. 4. The method of grabbing frames from the camera used due to edge hardware does not offer synchronization between multiple streams—each stream had its own frame identification sequence number that was independent from the other streams' sequence numbers. The hash synchronization mechanism allows the ALERT system to process the same video stream on separate processors without requiring the camera to generate coordination or organization information.

The core processor and the edge processor each receive a separate, independent video stream from the same IP camera, as shown in FIG. 4. This leads to the synchronization issue described above.

The invention herein offers that the frames themselves were identical at the pixel level and thus the frames could be mapped to each other based on that comparison.

The bandwidth and processing power requirements of sending and comparing entire frames are prohibitively expensive in the context of the invention. This issue is overcome by hashing the frame at both the edge and the core.

The fact that even a slight change (a single bit difference) in the input to a hash function results in a vastly different hash output ensures a unique identifier for each frame and permits synchronizing the video streams to the edge and the core.

The invention hashes frames until the edge receives confirmation from the core that the streams have been synchronized.

At this point, the timestamp differences between the edge's stream and the core's stream are known, and the system discontinues hashing every frame and returns to normal operation, easing the system processing requirements.

The edge processor of the system pre-conditions video data for analysis by the core processor. This includes pre-processing functions, baseline analytics, and post-processing compression.

The edge processor enhances the functionality of the core processor and reformats the camera video into a standard compressed format that the core processor requires.

Pre-processing functions in the invention comprise:
1. Automatic contrast adjustment or automated gain control (AGC)
2. Histogram equalization
3. Color Bayer pattern demosaicing
4. Image stabilization Analytic functions in the invention include:
1. Robust motion detection that utilizes non-compressed data
2. Tracking window identification
3. Feature-based characterization of tracked windows contents Analytic metadata output comprises the following:
1. A bounding box window of moving targets
2. Window unique ID
3. Speed and direction of travel metrics (expressed in pixels per frame)
4. Shape based salient object features—to include aspect ratio, area, and perimeter-associated with each object.
5. Intensity and color-based salient features, in the cases when color processing is handled on edge processors The edge processor of the invention supports GigE input (up to 1000 Mb per second, bidirectional), as shown in FIG. 5.

Figure 5:
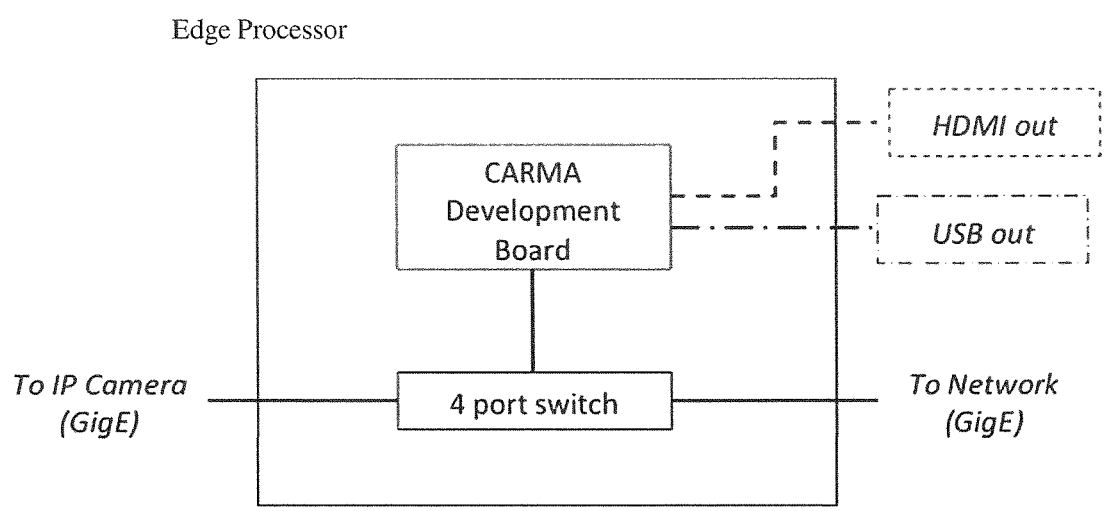
FIG. 5 is a schematic illustration of the edge processor.

The edge processor supports GigE output to allow connection to a network switch, illustrated in FIG. 5, and has two basic output modes, depending on whether or not the output is further analyzed by a core processor or displayed on a standard workstation loaded with appropriate software.

The edge processor outputs analytic metadata and compressed video.

The output bandwidth of each edge processor is programmable and is primarily limited by network capacity and the input capacity of the core processor.

An exemplar power specification of a preferred embodiment is 12V DC, 25 watts max. This specification can be met using Power over Ethernet (PoE) technology meeting the IEEE standard.

Use of PoE technology for the edge processor will eliminate the need for a battery or co-locating near a power outlet.

The edge processor with the invention comprises a Development Board (Dev BD) and a mobile graphics processing unit, illustrated in FIG. 5, and is designed to provide basic spatio-temporal saliency analytics.

The edge processor includes a compact network switch, as shown in FIG. 5, to permit the network connection between the Dev BD and the camera to be isolated from the remainder of the security network, allowing high bit-rate video to be sent to the edge processor without bogging down the remainder of the network. This housing includes HDMI and USB port extensions from the Dev BD.

A single processing stream is defined as the complete set of mathematical operations required to convert a video sequence of image frames into a sequence of edge system windows. A number of processing streams are run simultaneously on the edge device, with each running at a different frame rate, as in FIG. 6.

The pre-processing flow includes the following functions:
1. H.264 decoding
2. Image stabilization
3. Spatial re-sizing The built-in hardware has decoders for H.264. The other two processes may be run on the CPU using open-source library function calls.

Figure 6:
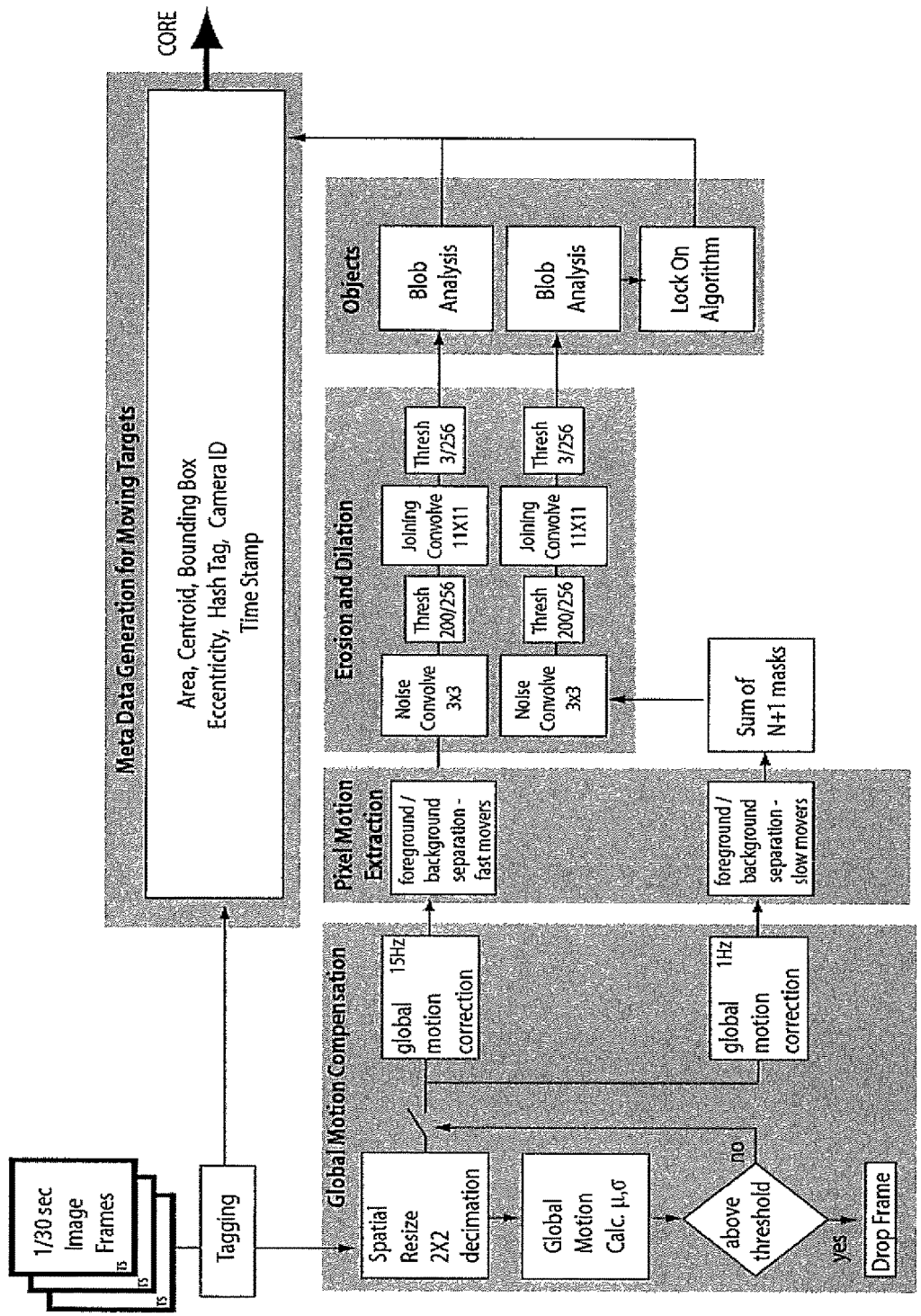
FIG. 6 is a schematic illustration of the edge processor algorithm flow.

The spatial re-size in FIG. 6 reduces the image to a quarter of the input size using "nearest neighbor" interpolation.

Motion-based salient features are detected on the edge processor utilizing a Gaussian mixture model for background subtraction, demonstrated in FIG. 6. This includes a foreground binary mask to remove noise. A morphological operation is included to connect nearby components into larger objects.

The system analyzes this modified foreground mask to find larger objects. Location information is output for one or more each of these objects.

The background subtraction function utilizes default input parameters, with shadow detection built into the Gaussian mixture model operating on color imagery.

A morphological erosion noise removal algorithm is implemented and utilizes a convolution with an averaging filter, followed by pixel-wise comparison with a threshold, as illustrated in FIG. 6.

This erosion operation takes advantage of GPU-acceleration. The threshold may be a reasonably large fraction of the kernel area. Only convolution outputs exceeding the threshold are kept, as in FIG. 6.

A morphological dilation operation follows the erosion, and is used to connect smaller clusters into larger objects. This can be accomplished using a convolution with an averaging kernel and keeping any non-zero mask pixel, as shown in FIG. 6.

The blob analysis output of the morphologically transformed binary mask may be analyzed to output the larger objects as system alerts, as illustrated in FIG. 6. This function marks the end of GPU acceleration for temporal processing and is run on the CPU.

This output function may be configured in the system and is used to detect global scene motion. If the output number exceeds a threshold, then a "global motion" flag will be sent rather than an alert on individual moving windows.

Size based object filters at the edge are utilized to remove noise related false alarms.

To remove flickering foreground objects and keep only those maintaining a constant motion, the system may be configured to keep a short memory of past alerts. These alerts can remain hidden unless they are detected consistently in the past history of events.

Object centroid values are calculated utilizing moments of inertia corresponding to each object.

A Kalman-filter based tracking algorithm is used to assign unique identifications to the same object across multiple frames. This tracking mechanism is described below.

The core processor may be a GPU cluster on a server rack. This rack has dual CPUs on the motherboard and large amounts of RAM.

The core hardware includes configuration of hard drives for local archive.

A modified core processor will subsume the edge processing on the separate Dev BD.

The core processor of the invention produces a number of analytics related to intrusion detection, threat detection, and forensic analysis for perimeter surveillance utilizing IP-based security cameras.

Figure 7:
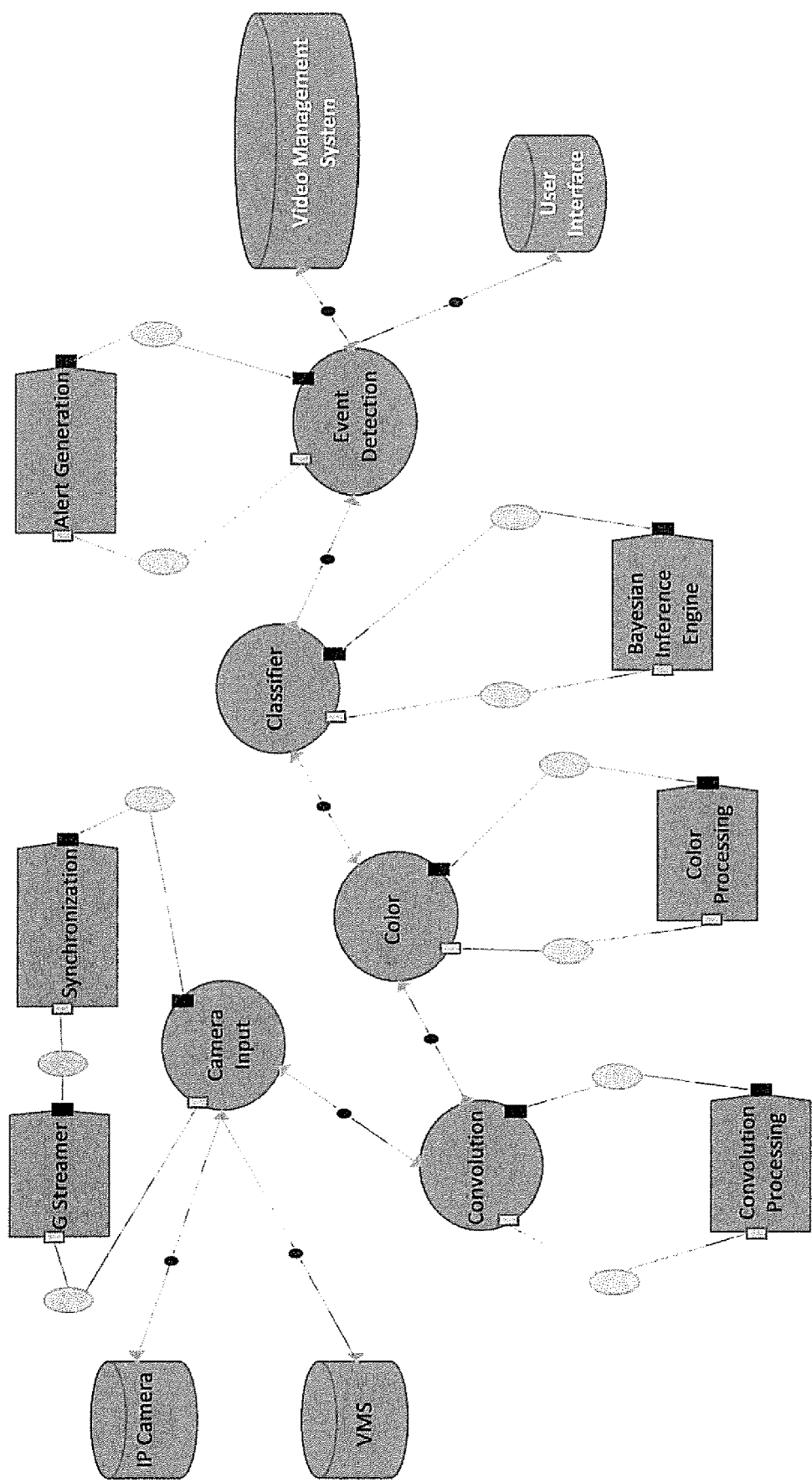
FIG. 7 is a schematic illustration of the core processing flow.

The functional processes performed by the core of the invention include video decoding and decompression as well as image or video reformatting, preprocessing, saliency of spatial and temporal channels, color selection, hyperspectral anomaly detection and spectral feature match, cross-modal correlation, geo-location and registration, and motion detection and recognition of objects, humans and vehicles, illustrated in FIG. 7.

The core processor may be comprised of GigE ports for direct connection either to multiple high resolution IP cameras or to a network switch.

Camera types supported by the system include color and monochrome visible, near infrared, short wave infrared, mid wave infrared, long wave infrared, far infrared, and hyperspectral cameras.

The core processor output specification must match integration specifications of VMS.

Other inputs required are the rules-set for the recognition engine, which are initially required for a new system but can be phased out as the cognitive rules are adapted over a period of weeks.

Mission profiles may also be setup using the initial rule sets that are adaptively learned based on a number of parameters: proximity-based, events-based, behavior-based, and mission-based.

The output of the core processor includes the compressed video output for archiving and storage and the core processing analytics, as shown in FIG. 7.

The output of the analytic metadata matches that of VMS specifications to allow integration into these systems, as shown in FIG. 7.

This output of analytic metadata integration includes use of the core processor analytics in forensic analysis and in immediate priority threat alerts, as shown in FIG. 7.

Processing at the core comprises color-based salient feature extraction, metadata classification and priority queue, orientation-based saliency extraction via spatial convolution, object classifier, trackers, and persistent object detection, all shown in FIG. 7.

Core processing metadata output includes event ID, size, location, timestamp, camera ID, object class, object velocity, object acceleration, color anomaly flag, and color classification, illustrated in FIG. 7.

The cluster outputs are determined for the sampled frame and are matched to the nearest neighbor from the previously determined color clusters using a Hungarian matching algorithm, as illustrated in FIG. 7.

At the full frame rate, each pixel is matched to the nearest color cluster value, as illustrated in FIG. 7.

Distance on a per-pixel basis to the nearest matching cluster value is calculated. If this exceeds a threshold, and if the number of grouped anomalies exceeds another threshold, then the color anomaly flag is annotated for that region, as illustrated in FIG. 7.

For objects detected in the edge processing, pixels within the object bounding box region are ranked based on color cluster value. Color-based salient features consists of the fraction of bounding box pixels containing a given cluster value.

Valid metadata output for edge annotated object A could be the following: 0, 0.2, 0.1, 0, 0, 0, 0.5, 0.2. This means that for an eight-color cluster, 20% of the object's pixels were of color type 2, 10% of color type 3, 50% of color type 7, 20% of color type 8, and no pixels of the other colors.

A priority queue is utilized to determine which frames must be processed immediately for spatial information based on temporal processing data. This is used to keep the spatial convolution engine constantly running in a multi-camera system in which the camera input can outstrip the processing capacity of the core GPUs. The priority queue loads only important frames based on the edge processing determination, as illustrated in FIG. 7.

The spatial convolution filter bank have properties for image analysis such as selectivity to orientation, scale sand spatial frequency, and being especially suited to characterize image texture, as demonstrated in FIG. 8.

Use of a filter bank instantiates a virtual hypercolumn creating a set of parallel output channels each tuned to extract a specific spatial orientation saliency, as demonstrated in FIG. 8.

The filter bank in the preferred embodiment is applied to each raw color channel and to the grayscale image, though any number of filter algorithms and image processing algorithms are contemplated as within the scope of the invention.

Convolution kernels, illustrated in FIG. 8, are spread over multiple GPUs with one kernel per GPU in a preferred embodiment.

The GPUs all require the same input and each GPU is configured to copy the input to its own local memory to run the convolutions in parallel.

The output of every spatial convolution over object windows are combined into local histograms of preferred filter orientations at the pixel. This histogram is weighted by the convolution difference between the maximum filter magnitude and the minimum filter magnitude at every given pixel.

The invention exploits the vector math abilities of the GPU processors to run a convolution on multiple images at the same time.

The GPU runs arithmetic operations on multiple values in one instruction, so it is efficient to incorporate multiple images into one variable to minimize processing time.

Figure 9:
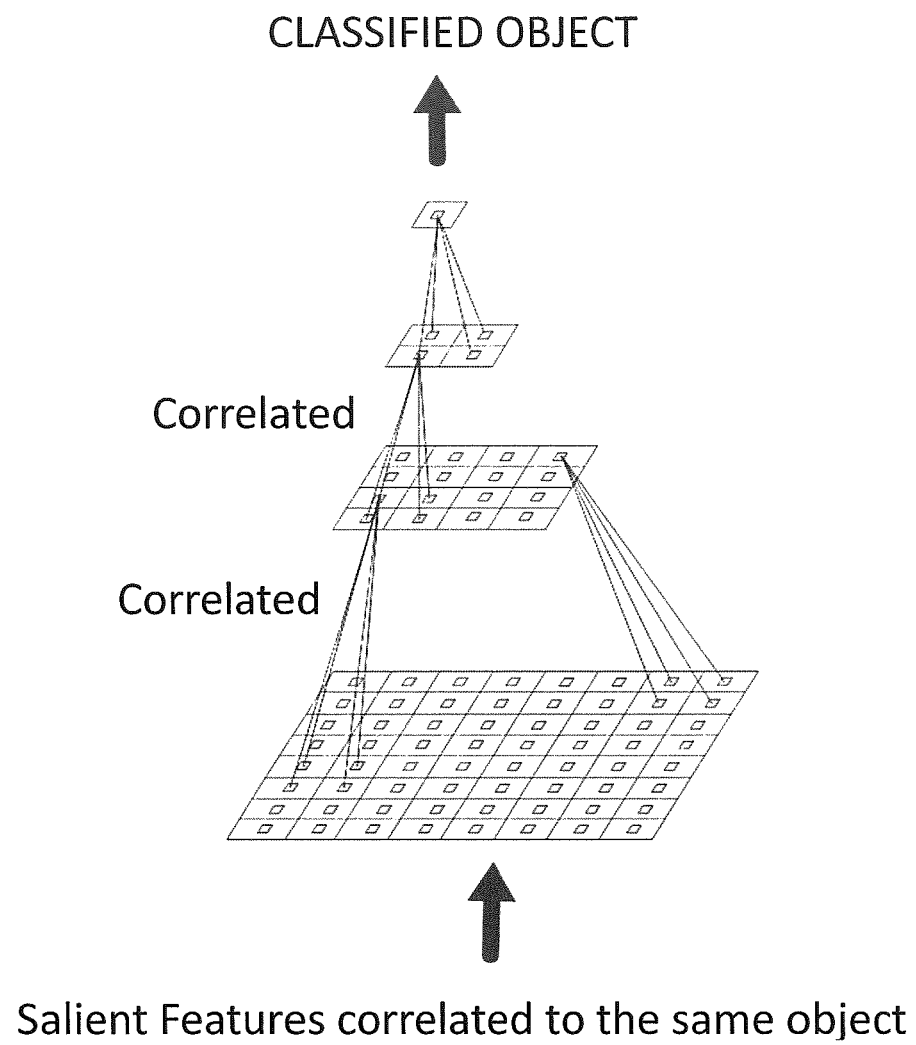
FIG. 9 is an illustration of the Prymidal Bayesian Network.

The object classifier makes use of the pyramid graph Bayesian Network (PBN) (FIG. 9). The PBN has a property that the nodes are hierarchical belonging to a level in the pyramid with the lowest (base) level observed.

Each pyramid level is a rectangular grid.

The hierarchical nodes have dependencies on axis-aligned neighbors in the same level or adjacent nodes in the parent level.

This type of network works with recognition and situation assessment.

The bottom level adjacent node corresponds to the collateral salient information from different sources. This includes data derived from shape and motion properties determined in edge processing, color characteristic properties, and spatial convolution properties determined at the core.

The PBN maintains prior and posterior probability estimates of optimal parameter sets describing a behavior. The PBN contains a number of nodes whose parameters specify a transformation on the incoming information assuming that a behavior is continuously parameterized.

PBNs are employed in the invention to design independent agents because they have formal probabilistic semantics.

The PBN used in the invention are composed of nodes and arrows. The structure specifies how the nodes are connected.

Each node represents a variable (or source of information) that can take on many discrete or continuous states.

In the invention, all PBN nodes may have discrete states.

An arrow connecting two nodes indicates a dependent relationship between the two nodes, meaning that a state can influence the state of the connected node.

How much influence the dependent relationship has on the nodes are specified in the conditional probability tables (CPTs), which are also called parameters.

The PBN structure can be formed using a combination of expert knowledge and training data.

In the invention, each salient feature (spatial, temporal, color, and shape-based) serves as a node, with values in each salient feature binned to a fixed number of states.

The classifier illustrated in FIG. 7 operates to classify edge-determined windows into a number of classes, which includes classification of parts as well as whole figures.

These classes are outputs of the core processor, as illustrated in FIG. 7.

Tracking is applied to classified objects, as illustrated in FIG. 7.

For objects in a given class, objects are matched from one frame to another utilizing a Hungarian matching algorithm, as illustrated in FIG. 7.

The predicted position of each object from the previous frame is matched to the nearest object in the current frame, and the Hungarian algorithm is used to ensure the optimal match is made for the overall frame, as illustrated in FIG. 7.

In order to predict the next object position, a Kalman filter predictor is used, illustrated in FIG. 7.

Tracking IDs determined from this module are an output of the core processor, as illustrated in FIG. 7.

Persistent objects, newly appearing objects that remain static over a long period of time (a dropped bag, for example), are detected on a slowly sampled video stream using the edge (motion) processing algorithms, as shown in FIG. 6.

The invention constructs a binary image of the motion processing, where a pixel is turned on if motion is detected and turned off if no motion is detected.

The invention sums the binary images from the last several iterations of this slow sampling motion process. If any pixels from this sum exceed a certain threshold, the invention determines that a persistent object has been detected.

The invention erodes and dilates the resulting thresholded frame to remove noise as in normal motion processing.

The invention utilizes multiple looks of the same object(s) in different frames to improve accuracy and remove anomalous mis-characterizations of object class, type, color, size, speed and direction of travel.

Many alterations and modifications may be made by those having ordinary skill in the art without departing from the spirit and scope of the invention. Therefore, it must be understood that the illustrated embodiment has been set forth only for the purposes of example and that it should not be taken as limiting the invention as defined by the following claims. For example, notwithstanding the fact that the elements of a claim are set forth below in a certain combination, it must be expressly understood that the invention includes other combinations of fewer, more or different elements, which are disclosed above even when not initially claimed in such combinations.

The words used in this specification to describe the invention and its various embodiments are to be understood not only in the sense of their commonly defined meanings, but to include by special definition in this specification structure, material or acts beyond the scope of the commonly defined meanings. Thus if an element can be understood in the context of this specification as including more than one meaning, then its use in a claim must be understood as being generic to all possible meanings supported by the specification and by the word itself.

The definitions of the words or elements of the following claims are, therefore, defined in this specification to include not only the combination of elements which are literally set forth, but all equivalent structure, material or acts for performing substantially the same function in substantially the same way to obtain substantially the same result. In this sense it is therefore contemplated that an equivalent substitution of two or more elements may be made for any one of the elements in the claims below or that a single element may be substituted for two or more elements in a claim. Although elements may be described above as acting in certain combinations and even initially claimed as such, it is to be expressly understood that one or more elements from a claimed combination can in some cases be excised from the combination and that the claimed combination may be directed to a subcombination or variation of a subcombination.

Insubstantial changes from the claimed subject matter as viewed by a person with ordinary skill in the art, now known or later devised, are expressly contemplated as being equivalently within the scope of the claims. Therefore, obvious substitutions now or later known to one with ordinary skill in the art are defined to be within the scope of the defined elements.

The claims are thus to be understood to include what is specifically illustrated and described above, what is conceptually equivalent, what can be obviously substituted and also what essentially incorporates the essential idea of the invention.

We claim:

1. A real time video analytic image processor which emulates the human visual path comprising:
    an imaging sensor configured for capturing and outputting a sequence of image frames to define a video stream;
    an edge processor configured to receive the video stream to define an edge processor video stream;

a core processor configured to receive the video stream to define a core processor video stream;

the edge processor and the core processor comprising a hash synchronization function whereby the image frames are synchronized to the edge processor and the core processor using a unique hash identifier;

the edge processor configured to perform a video stream pre-processing function, an analytic function, an analytic metadata output function and a post-processing video compression function to provide an analytic metadata output and a compressed video output;

the core processor configured to receive the analytic metadata output and the compressed video output from the edge processor; and;

the core processor configured to perform a salient feature extraction function by means of a convolution, an object classification and an event detection from the core processor video stream, the analytic metadata output and the compressed video output based on a correlation between an observed object and an object of interest.

2. The image processor of claim 1 comprising a plurality of imaging sensors, each imaging sensor configured for capturing and outputting a sequence of image frames to define a plurality of independent video streams.

3. The image processor of claim 1 configured for processing still imagery.

4. The image processor of claim 1 configured for processing high definition (HD) video or full motion video (FMV) imagery.

5. The image processor of claim 1 configured for processing thermal imagery.

6. The image processor of claim 1 configured for processing multispectral imagery.

7. The image processor of claim 1 configured for processing hyperspectral imagery.

8. The image processor of claim 1 configured for processing LIDAR imagery.

9. The image processor of claim 1 configured for processing radar imagery including synthetic aperture array (SAR) and ground moving target indicator (GMTI) imagery.

10. The image processor of claim 1 wherein the salient feature extraction, classification and annotation function is performed in real time at the same rate as the sensor is producing image data.

* * * * *